US006965216B2

(12) United States Patent
Pavlovic et al.

(10) Patent No.: US 6,965,216 B2
(45) Date of Patent: Nov. 15, 2005

(54) METHOD AND APPARATUS FOR AMELIORATING ELECTROLYTE STRATIFICATION DURING RAPID CHARGING

(75) Inventors: Vladimir Pavlovic, Mississauga (CA); Robert Field, Oakville (CA); G. Robert Pickering, Acton (CA)

(73) Assignee: Edison Source, Irvine, CA (US)

( * ) Notice: Subject to any disclaimer, the term of this patent is extended or adjusted under 35 U.S.C. 154(b) by 136 days.

(21) Appl. No.: 09/989,940

(22) Filed: Nov. 21, 2001

(65) Prior Publication Data

US 2003/0094927 A1 May 22, 2003

(30) Foreign Application Priority Data

Nov. 20, 2001 (CA) ............................................ 2363604

(51) Int. Cl.[7] .................................................. H02J 7/04
(52) U.S. Cl. ....................................... 320/157; 320/162
(58) Field of Search ................................ 320/157, 162, 320/152, 154, 155, 145, 134, 132, 129, 125, 160; 324/426, 433

(56) References Cited

U.S. PATENT DOCUMENTS 4,947,124 A 8/1990 Hauser ....................... 320/129
4,956,597 A 9/1990 Heavey et al. .............. 324/430
5,307,001 A * 4/1994 Heavey ...................... 320/125
5,561,360 A 10/1996 Ayres et al. ................ 320/129
5,680,031 A 10/1997 Pavlovic et al. ............ 320/145
5,708,348 A * 1/1998 Frey et al. .................. 320/145
6,081,104 A * 6/2000 Kern .......................... 323/268
6,094,033 A 7/2000 Ding et al. ................. 320/132
6,456,042 B1 9/2002 Kwok ........................ 320/134
6,483,198 B2 * 11/2002 Schmitz et al. ........... 290/40 C
6,495,992 B1 * 12/2002 Pavlovic ..................... 320/161

FOREIGN PATENT DOCUMENTS

JP 07073903 A * 3/1995 .......... H01M/10/44
WO WO 00/76049 A1 12/2000

* cited by examiner

*Primary Examiner*—Michael Sherry
*Assistant Examiner*—Lawrence Luk
(74) *Attorney, Agent, or Firm*—Harness, Dickey & Pierce, P.L.C.

(57) ABSTRACT

An apparatus and method for recharging a rechargeable lead acid battery. The apparatus supplies an overcharge current to the battery during and before completion of recharging of the battery to ameliorate stratification of the battery.

20 Claims, 10 Drawing Sheets

SYSTEM ARCHITECTURE

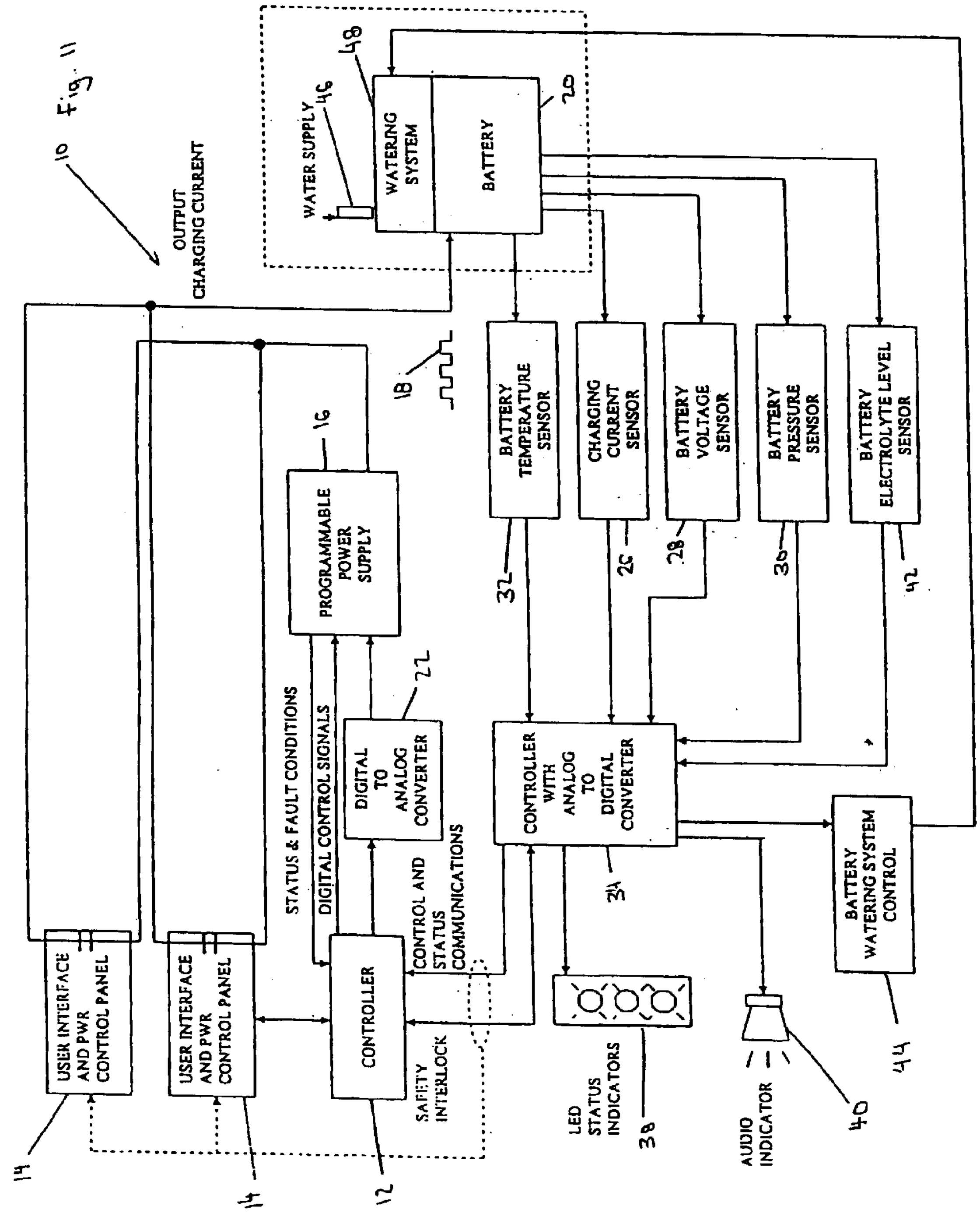
Fig. 11
10
OUTPUT CHARGING CURRENT
WATER SUPPLY
46
48
WATERING SYSTEM
BATTERY
20
18
PROGRAMMABLE POWER SUPPLY
16
BATTERY TEMPERATURE SENSOR
CHARGING CURRENT SENSOR
BATTERY VOLTAGE SENSOR
BATTERY PRESSURE SENSOR
BATTERY ELECTROLYTE LEVEL SENSOR
32
26
28
30
42
22
DIGITAL TO ANALOG CONVERTER
STATUS & FAULT CONDITIONS
DIGITAL CONTROL SIGNALS
CONTROLLER WITH ANALOG TO DIGITAL CONVERTER
34
BATTERY WATERING SYSTEM CONTROL
44
CONTROL AND STATUS COMMUNICATIONS
USER INTERFACE AND PWR CONTROL PANEL
USER INTERFACE AND PWR CONTROL PANEL
CONTROLLER
SAFETY INTERLOCK
LED STATUS INDICATORS
38
AUDIO INDICATOR
40
14
14
12

METHOD AND APPARATUS FOR AMELIORATING ELECTROLYTE STRATIFICATION DURING RAPID CHARGING

FIELD OF THE INVENTION

The present invention relates to battery charging, and more particularly to a method and apparatus for ameliorating electrolyte stratification during charging.

BACKGROUND OF THE INVENTION

Batteries are devices that convert chemical energy contained in active materials directly into electrical energy by means of an oxidization-reduction electrochemical reaction involving the transfer of electrons from one material to another. Lead-acid batteries are one of the most common kinds of batteries. Such a battery includes positive and negative lead electrodes and a mixture of sulfuric acid ($H_2SO_4$) and water between the electrodes. The sulfuric acid provides both the current conducting medium between the positive and negative electrodes, as well as an active material in the electrochemical reactions at the electrodes.

During discharge of the battery, the negative electrode is formed by the lead (Pb) being oxidized to $Pb^{2+}$: $Pb \rightarrow Pb^{2+} + 2e^-$.

The complete reaction is:

$$Pb+H_2SO_4 \rightarrow PbSO_4 \downarrow +2H^+ +2e^-.$$

Concurrently, the positive electrode is formed by $Pb^{4+}$ being reduced to $Pb^{2+}$ in the following reaction:

$$Pb^{4+}+2e^- \rightarrow Pb^{2+}.$$

The complete reaction is:

$$PbO_2+H_2SO_4+2H^+ +2e^- \rightarrow PbSO_4 \downarrow +2H_2O.$$

As the lead-acid battery is discharged, lead (Pb) and lead dioxide ($PbO_2$) are converted into lead sulfate ($PbSO_4$). The water ($2H_2O$) produced and the sulfuric acid ($H_2SO_4$) consumed dilute the electrolytic solution causing the lower density readings observed on a discharged battery.

Lead-acid batteries can be recharged using chargers falling into two broad classes: simple chargers, and closed loop or feedback chargers. Simple chargers deliver a low level charge current to the battery over a timed interval. The current level is chosen to prevent damage to the battery due to overcharging. Feedback chargers, on the other hand, monitor the state of the battery in order to control the magnitude of the charge current during the charge cycle. The charge cycle is composed of a high current phase and a regulation phase. During the high current phase, the feedback charger applies a high charge current to the battery in order to rapidly charge the battery. The feedback charger continues to monitor the state of the battery and reduces the charging current as the charge state of the battery is restored.

At room temperature the density of sulfuric acid is 1834 $kg/m^3$, which is more than 1.8 times the density of water (1000 $kg/m^3$). This difference in density can cause problems during recharging, particularly when the recharging occurs at a rapid rate, as the relatively higher density of the sulfuric acid causes it to settle downward relative to the water. This problem can be seen in more detail by examining the chemical reactions that occur during recharging. The downward arrows shown beside some products of the reaction indicate that these products are being deposited onto the plates When the lead-acid battery is being charged, sulfuric acid is produced at both electrodes according to the following reactions:

At the positive electrode: $PbSO_4+2H_2O \rightarrow PbO_2 \downarrow +H_2SO_4+2H^+ +2e^-$ At the negative electrode: $PbSO_4+2H^+ +2e^- \rightarrow Pb \downarrow +H_2SO_4$ As the sulfuric acid concentration rises near the positive and negative electrodes, the acid's higher density causes it to pour down the electrodes to raise the acid concentration at the bottom of the cell. This problem is called stratification.

Battery voltage depends on the acid concentration. Consequently, higher voltage is required near the bottom of a stratified cell to overcome the elevated equilibrium voltage and drive the charge reaction, leaving the bottom portion less charged. If the problem is not corrected, the conditions at the bottom of the electrodes will progressively deteriorate with every charge cycle performed. Eventually, the capacity of the cell will be irreversibly reduced.

In the prior art, this problem has been addressed by providing a 10 to 20% low rate overcharge at the end of every charge cycle. When the rate of electron flow (current) exceeds the rate of the main charge reaction, the unused electrons begin participating in irreversible side reactions (water electroysis):

The reaction at the positive electrode is $2H_2O \rightarrow O_2+4H^+ +4e^-$

The reaction at the negative electrode is $4H^+ +4e^- \rightarrow 2H_2$

The relationship between current and amount of water decomposed can be evaluated using the Faraday constant (equivalent to 96485 As or 26.8 Ah). As the number of exchanged electrons in the electrolysis reaction is two, 53.6 Ah is required to decompose 1 molar weight of water (18 g). Thus, 1 Ah of overcharge current decomposes 0.336 g of water generating 0.68 liters of gas under normal conditions (at 25 degrees centigrade and normal atmospheric pressure). The gases produced by water electrolysis ($H_2$ and 0), rise through the system causing an upward mixing movement of the liquid that ameliorates stratification. The intensity of the mixing movement of the gas is controlled by the rate of gassing or overcharge.

The solution of providing a 10 to 20% low rate overcharge at the end of every charge cycle suffers from the drawback that it is time-consuming, thereby largely canceling the advantages of rapid recharging. Also, a high overcharge rate tends to corrode the electrodes, thereby shortening the useful life of the battery. These effects are exacerbated at higher temperatures.

Thus, a method and apparatus for rapidly recharging batteries while avoiding stratification is desirable.

SUMMARY OF THE INVENTION

An object of one aspect of the present invention is to provide an improved battery charger.

In accordance with an aspect of the present invention there is provided a battery charger having generator means for generating a charging current for charging the battery and controller means for controlling the generator means. The generator means is operable to generate an overcharge current increment to be added to the charging current to yield an overcharge current. The controller means includes feedback means for determining at least one of a charge acceptance ability and a state of charge of the rechargeable lead-acid battery during recharging, overcharge instruction means for determining the overcharge current, the overcharge current exceeding the charge acceptance ability of the battery, and current control means for controlling the generator to supply the charging current and the overcharge current increment. The current control means is operable to deliver the overcharge current to the battery during charging.

Preferably, the overcharge instruction means is operable to determine an overcharge duration and an overcharge time, and the current control means is operable to deliver the overcharge current to the battery for the overcharge duration at the overcharge time.

An object of another aspect of the present invention is to provide an improved method for recharging a rechargeable lead-acid battery.

In accordance with this aspect of the present invention there is provided a method for recharging a rechargeable lead-acid battery. The method includes the steps of (a) generating a charging current for charging the battery; (b) supplying the charging current to the battery; (c) determining at least one of the charge acceptance ability and a state of charge of the rechargeable lead-acid battery; (d) determining the overcharge current, the overcharge current exceeding the charge acceptance ability of the battery; (e) determining an overcharge current increment to be added to the charging current to yield the overcharge current; and, (f), during step b, supplying the overcharge current increment to the battery, the current control means being operable to deliver the overcharge current to the battery during charging.

Preferably, the method also determines an overcharge duration and an overcharge time. The overcharge current is supplied to the battery for the overcharge duration at the overcharge time.

BRIEF DESCRIPTION OF THE DRAWINGS

Reference will now be made to the accompanying drawings which show by way of example preferred embodiments of the present invention and in which:

FIG. 11 is a block diagram of a battery charger suitable for the charging process according to the present invention.

DETAILED DESCRIPTION OF THE PREFERRED EMBODIMENTS

Figure 1:
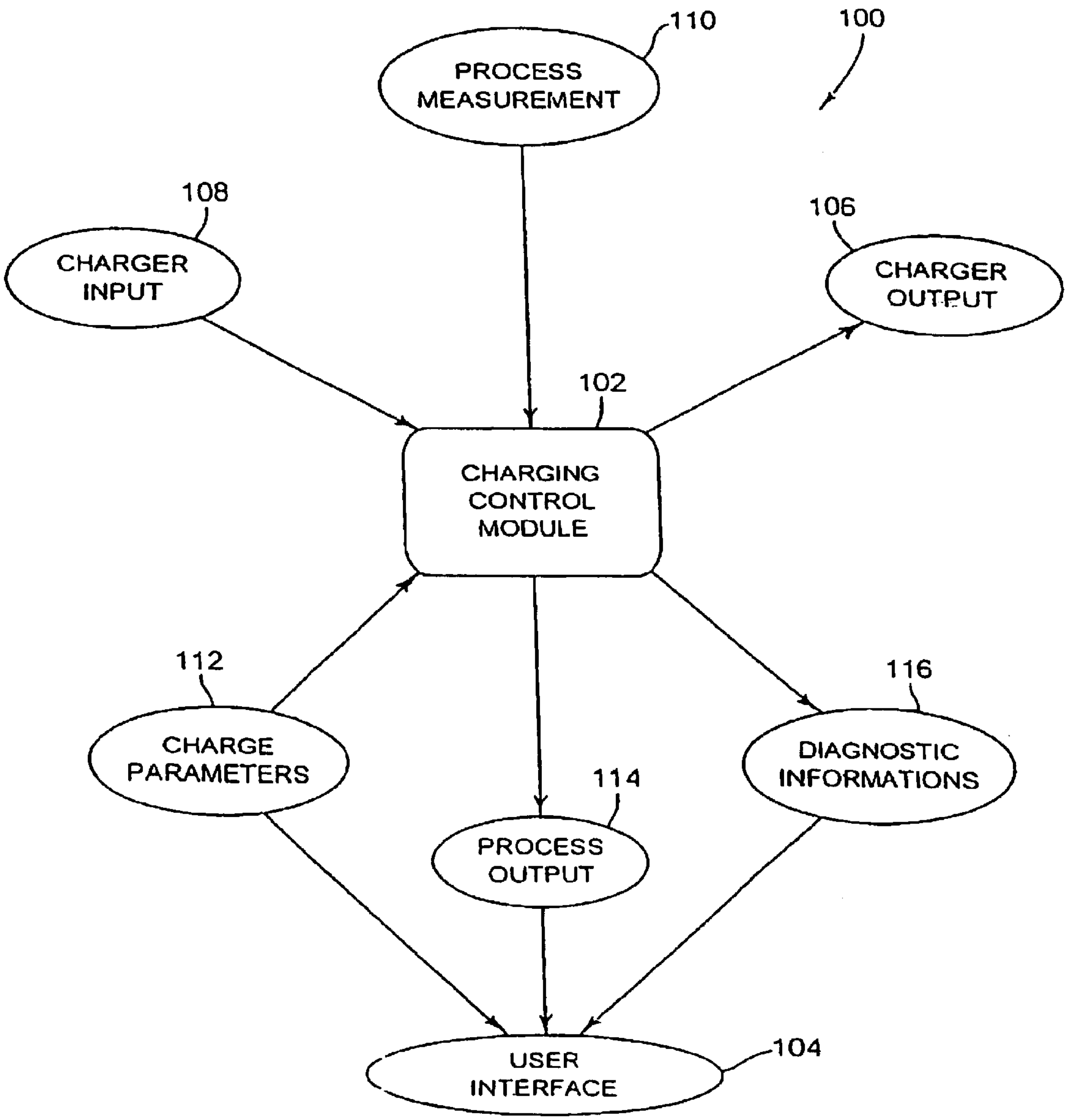
FIG. 1 shows in block diagram form a method for regulating a charging current according to the present invention.

According to an aspect of the present invention, destratification of a lead-acid battery during recharging is ameliorated by supplying a controlled brief overcharge pulse to the battery to mix the electrolyte at a few different times during the recharging process. Mixing of the electrolyte is most effective when the overcharge pulses are supplied to the battery when the battery is between 60 to 100% state of charge (SOC). The overcharge pulse is carried out by increasing the current supplied to the battery from the charge current to an overcharge current that exceeds the charge acceptance ability (CAA) of the battery for 0.5 to 5 minutes. In the preferred embodiment, the procedure is repeated two to three times during the charge cycle—for example, at around 60, 80 and 95% SOC.

According to a preferred embodiment of the present invention, the charging method substantially conforms to that disclosed in International Patent Application PCT/CA98/00308, published 8 Oct. 1998, and additionally incorporates the destratification function. As taught by this patent application, the lead-acid battery may be fast charged by a feedback charger that monitors the state of the battery to control the magnitude of the charge current during the charge cycle. As will now be described, the present invention applies to fast charging of lead-acid batteries to ameliorate stratification.

Referring to FIG. 11, there is shown in a block diagram, a battery charger 10 for performing a charging method according to the present invention. The battery charger comprises a controller 12, a user interface and power control display panels 14, and a programmable power supply 16.

The programmable power supply 16 generates a charging current I indicated by reference 18 for charging a battery 20, which is coupled to the charger 10. The controller 12 is coupled to an analog input on the programmable power supply 16 through a digital-to-analog (D/A) converter 22. The D/A converter 22 provides an analog control signal output to the power supply representing the relative level of the charging current I to be applied to the battery 20. The analog input accepts a control voltage signal from the D/A converter 22 in the range 0 to 10 VDC. The control voltage signal represents a range of 0% to 100% of the full scale output current capacity of the programmable power supply 16.

The programmable supply 16 also includes a buffered digital input/output (I/O) interface coupled to respective output and input ports on the controller 12. The programmable power supply 16 receives digital control signals issued by the controller 12 for setting the charging current I ON/OFF and for clearing a FAULT condition. Preferably, the power supply 16 accepts a digital input signal from the controller 12 which causes the instantaneous shut-down to 0% output charging current I. The programmable power supply 16 also outputs digital signals to the controller 12 to indicate status and fault conditions—for example, overtemperature, DC bus voltage too high, DC bus voltage too low. One skilled in the art will be familiar with the implementation of the programmable power supply 16.

The controller 12 comprises a microprocessor, or processor board, which has been suitably programmed to execute a charging program and stratification control method according to the present invention. The charging process is configured by parameters that are entered through the user interface and power control display panels 14. The user interface and power control display panels 14 preferably include a display and a keyboard, or keypad, for entering the charge parameters for a battery type. The user interface and power control panels 14 may also include input devices for reading battery parameter identifiers associated with certain known types of battery. The incorporation of multiple user interface and power control display panels into the battery charger of FIG. 11 allows several batteries to be assigned to the same charging station, as described in U.S. Pat. No. 5,548,200.

The controller 12 uses the user interface and power control display panels 14 to display battery charge status, charging system status indicators, fault conditions and diagnostic information. The display panel also includes input keys to start/stop the battery charging process, and display prompts/messages for prompting the user to connect the battery 20 to the charger 10 and enter the charge parameters.

As described above, the charger 10 operates as a feedback charging system. As shown in FIG. 11, the charger 10 includes sensors for monitoring various parameters of the battery 20. The sensors include a charging current sensor 26, a battery voltage sensor 28, a battery pressure sensor 30, a battery temperature sensor 32 and a battery electrolyte sensor 42. The sensors 26, 28, 30, 32 and 42 comprise analog process measurement circuits and are coupled to respective input ports in the controller 12 through an analog-to-digital (A/D) converter and controller 34.

The charging current sensor 26 monitors the charging current I and is implemented using a current transducer, such as the LEM Module LT 500 available from LEM S.A. of Switzerland, connected to a load resistor and an analog amplifier (not shown) for conditioning the signal. The implementation of such analog circuitry will be familiar to one skilled in the art.

The battery voltage sensor 28 monitors the output voltage of the battery 20 and preferably comprises a scalable signal conditioning amplifier (not shown) having galvanic isolation, for example, provided by an opto-coupler (not shown).

The battery pressure sensor 30 monitors the internal pressure of the battery 20 and is implemented using a suitable pressure transducer such as the PX302 model available from Omega Engineering Inc.

The battery electrolyte level sensor 42 monitors the level of the electrolytic solution in the battery. If this level is too low, then this information is communicated to a battery watering system control 44 via A/D converter 34, which controls water supply 46 and watering system 48 to add water to the battery.

The battery temperature sensor 32 monitors the internal temperature of the battery 20 and is implemented using a solid state thermal sensor which is placed in contact with the exterior wall of the battery 20. A suitable temperature sensor is the LM335A solid state device available from National Semiconductor of Santa Clara, Calif. The temperature sensor 32 may include an analog conditioning amplifier (not shown) to condition the output signal from the temperature sensor 32. The output signals from the sensors 26–32 and 42 are fed into the A/D converter and controller 34 and digitized for input by the controller 12. Preferably, the A/D converter and controller 34 comprises a high speed 12-bit converter.

The digitized signals read by controller 12 from the A/D converter and controller 34 are utilized by the battery charging program and method in conjunction with battery and charge parameters inputted by the user. In response to the inputs, the process control program for the battery charger 10 calculates and updates the control commands for the programmable power supply 15. The process control program also continues to monitor the status and operation of the programmable power supply 16. If any faults are detected, the battery charging program terminates the charging cycle, i.e. turns off the power supply 16 and indicates the abort or fault status on the user interface and power control display panels 14 and on the LED status indicators 36. Specifically, a Red LED status indicator being "On" indicates that a fault has occurred. The Amber LED being "On" indicates that the station is charging a connected battery. The Green LED being "On" indicates that the station is on Standby, or is ready to start charging or has finished charging. If a fault requires immediate attention, then audio indicator 38 is used to alert the user that immediate attention is required. The processing steps embodied in the battery charging program and method are described in detail below with reference to FIGS. 1 to 10.

The maximum rate at which a battery can accept current at any given moment without being overcharged is termed the charge acceptance ability (CAA). CAA is a function of the state of charge, temperature, age of the battery and previous charging history. According to a preferred aspect of the invention, terminal voltage profiles are used to determine both CAA and state of charge (SOC) as taught by International Patent Application PCT/CA98/00308, published 8 Oct. 1998. However, other ways of determining both CAA and SOC are well known to those skilled in the art, and it will be apparent to those skilled in the art how the present invention may be implemented regardless of the particular method used to determine CAA and SOC.

Referring to FIG. 1, there is illustrated in a block diagram the organization of a battery charging program in accordance with an embodiment of the present invention. The battery charging program 100 comprises a charging control module 102, a user interface module 104, a charger output module 106, a charger input module 108, and a process measurement module 110.

The charging control module 102 comprises the method steps for controlling the charging of the battery according to the present invention, and is described in more detail below. The user interface module 104 provides the functions that control the operation of the user interface and power control display panels 14 (FIG. 11). The user interface module 104 processes inputs entered by the user into charge control parameters which are used by the charge control module, which are described in more detail below. The user interface module 104 also displays data from the charging control module 102 on the charging process as process outputs and as diagnostic information 116 on the user interface and power control display panels 14.

The charger output module 106 controls the operation of the programmable power supply 16 in response to control commands issued by the charging control module 102. The charger output module 106 provides the digital control signals to the D/A converter 22 to generate the control voltage signal for the programmable power supply 16. The charger output module 106 also generates the digital output signals, e.g. charge current ON/OFF and FAULT reset, to control the programmable power supply 16.

The charger input module 108 receives the status and fault signals issued by the programmable power supply 16. The status and fault condition signals are received on the input port of the controller 12 and transmitted to the charging control module 102 for processing. For example, in response to a power supply over-temperature condition, the charging control module 102 aborts charging the battery 20, the power supply 16 is shut down through the charger output modulel 106, and an "abort message" is displayed on the user interface and power control display panels 14 by the user interface module 104.

The process measurement module 110 oversees the input of signals from the charging current, battery voltage, battery pressure, and battery temperature sensors 26, 28, 30, 32 (FIG. 11). The analog inputs from the sensors are then digitized by the A/D converter 34. The digitized information obtained from the sensors is then stored in memory for use by the charging control module 102 as will be described in more detail below.

Figure 2:
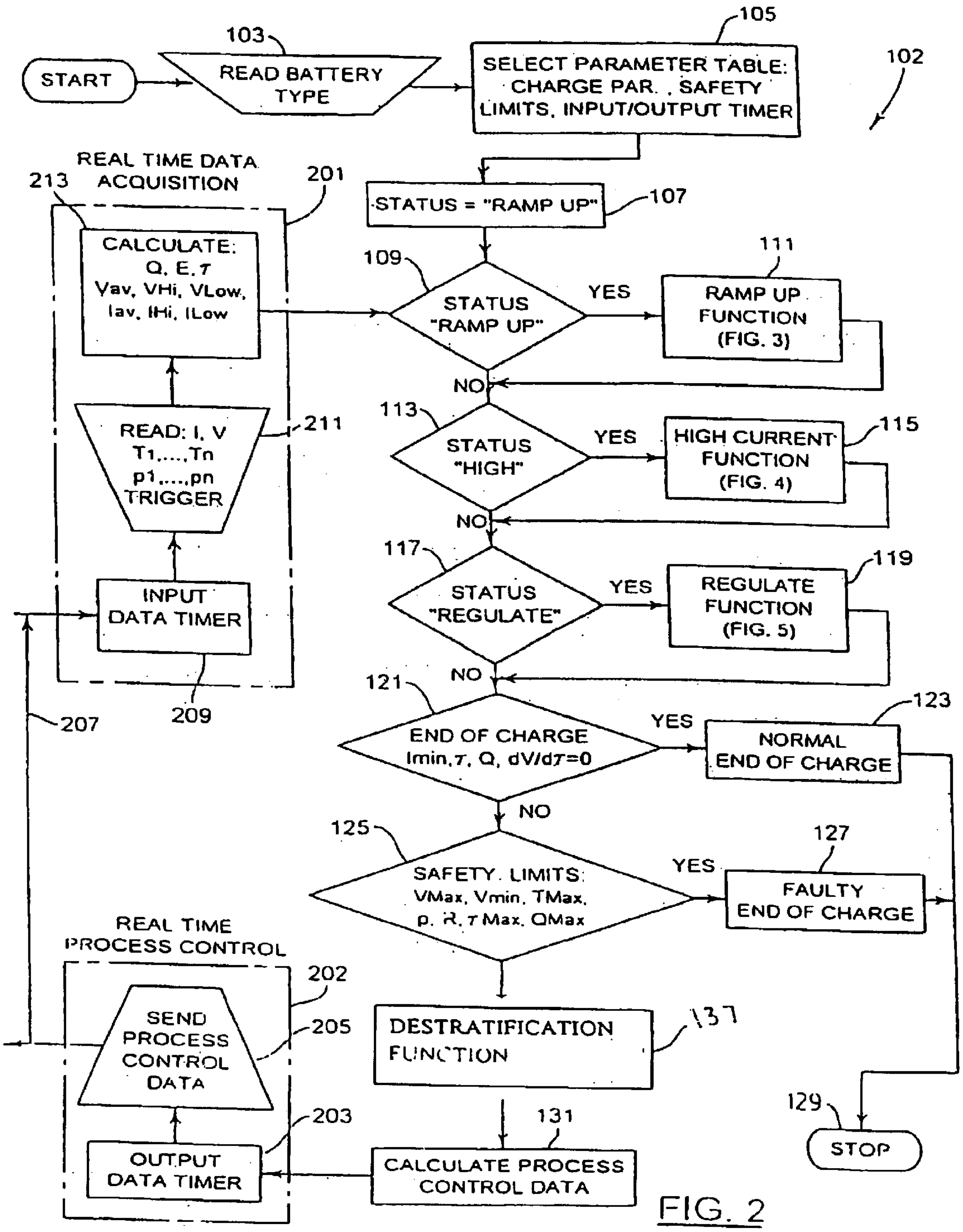
FIG. 2 is a flow chart for a charging method according to the present invention.

Reference is next made to FIG. 2, which shows the operation of the battery charger 10 and the charging control module according to the present invention.

At the start, the charging control 102 reads the battery type identifier in step 103 if the charger 10 includes an input device for reading the battery identifier. If the charger 10 does not include a reader for the battery type, then the user is prompted to input the battery type using the interface 14. The battery type information is used to select an appropriate Parameter table in step 105.

Figure 8:
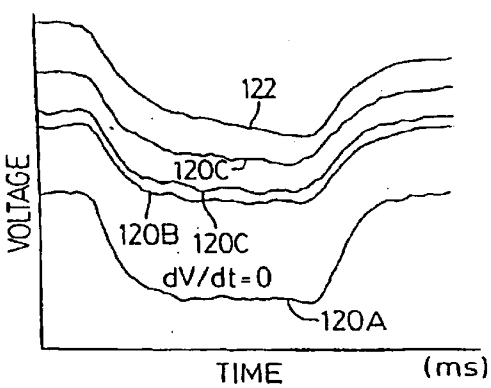
FIG. 8 is a graph showing voltage profiles characteristic of a first class of batteries.

The terminal voltage profile and the Parameter table are dependent on the type of battery. According to this aspect of the invention, batteries are categorized in Group I or Group II. Group I batteries comprise the most common battery types and include lead-acid and nickel-cadmium batteries. Group I batteries have a terminal voltage profile with a slope dV/dt as shown in FIG. 8. The terminal voltage profile is defined as the voltage of the battery when the charging current I is interrupted or varied as will be described below. At the beginning of the charging process for a Group I battery (i.e. the battery is discharged and the actual charging rate is below the battery charge acceptance ability), the slope dV/dt for the terminal voltage profile is almost flat as shown by curve 120*a*. As the battery is charged, the slope dV/dt of the terminal voltage profile increases as shown by curves 120*b*, 120*c*, 120*d*. Eventually, the slope dV/dt of the terminal voltage profile reaches its maximum value as shown by curve 122. The maximum-slope dV/dt of the terminal voltage profile, i.e. curve 122 in FIG. 8, means that charge acceptance ability, CAA, of the battery has been reached and that the charging current I must be reduced in order to avoid overheating and damaging the battery.

Group II batteries comprise nickel-metal hydride batteries. Group II batteries have a terminal voltage profile with a slope dV/dt as shown by the curves in FIG. 9. When the battery is fully discharged, the slope dV/dt of the terminal voltage profile (i.e. taken during the current variation interval) will exhibit a maximum slope dV/dt as denoted by curve 124*a* in FIG. 9. As the battery is charged, the slope dV/dt of the terminal voltage profile (e.g. taken during successive current variation intervals) decreases as shown by curves 124*b*, 124*c* and 124*d* in FIG. 9. When the battery is charged, i.e. the charging rate reaches the charge acceptance ability, the slope dV/dt of the terminal voltage profile approaches zero as shown by curve 126 in FIG. 9.

The Parameter table read in step 105 is dependent on the particular type of battery, e.g. nickel-cadmium or lead-acid (Group I) or nickel-metal hydride (Group II). The table preferably includes charge parameters, safety limits, and a sampling rate or resolution for the input/output timers described in more detail below. Preferably, the parameters-for various types of batteries contemplated for the charger 10 are stored in non-volatile memory, which is accessible by the controller 12.

As shown in FIG. 2, there are two modules 201, 202 which handle the data acquisition and control command transfer, respectively, with the charger 10. The data acquisition module 201 oversees the input of data from the sensors 26 to 32 (FIG. 11). The real time process module 202 outputs the digital control signals and the current control signal (via the D/A converter 22) to the programmable power supply 16.

In step 203 of the real time process control module 202, a time-base for outputting the output control commands is generated. Next at step 205, the output control commands are sent to the appropriate hardware drivers. As shown, there is also a loop-back path 207 between the real time process control module 202 and the real time data-acquisition module 201. The loop-back 207 provides a "trigger" for the real time data acquisition module 201 as described below.

Referring to FIG. 2, in step 209 the data acquisition module 201 generates a time-base for inputting, i.e. sampling, data. The sampling rate depends on the particular hardware being utilized and the desired resolution for the process control, as will be appreciated by those skilled in the art. For example, sampling once every 60 microseconds is suitable for the charger. In step 211, the data acquisition module 201 collects (at the sampling rate) current readings $I_1, \ldots I_n$ from the charging current sensor 26 (FIG. 11), voltage readings $V_1, \ldots V_n$ from the battery voltage sensor 28, pressure readings $P_1, \ldots P_n$ from the battery pressure sensor 30, and temperature readings $T_1, \ldots T_n$ from the battery temperature sensor 32.

In step 213, values for average voltage $V_{av}$, average charging current $I_{av}$, Coulombic charge Q, charge energy E, and elapsed charging time are calculated from the input data. The average current $I_{av}$, and average voltage $V_{av}$, values are calculated over a selected period. For example, one second. The Coulombic charge Q is calculated by integrating the values for the charging current $I_1, \ldots I_n$ and the charge energy E is calculated from the average current $I_{av}$" and the average voltage $V_{av}$.

In step 211, data corresponding to the high value for the charging current $I_{Hi}$, the low value for the charging current $I_{Low}$, the high value for the voltage $V_{Hi}$, the low value for the voltage $V_{Low}$, are also read in conjunction with the trigger provided on the loop-back path 207 from the real time process control module 202. The trigger for the high charging current $I_{Hi}$ comprises the output command to the programmable power supply 16 to raise the charging current I to the high value. Similarly, the trigger for the low charging current $I_{Low}$ comprises the output command to the power supply 16 to lower the charging current I to the low value. The values for the high voltage $V_{Hi}$ and the low voltage $V_{Low}$, are read in a similar manner. The data generated by the data acquisition module 201 is stored in memory for further processing.

Referring to FIG. 2, at the beginning of a charging cycle, status is set to 'RAMP UP" in block 107. The Ramp Up status means that the charging current I is ramped-up or increased to a HIGH current level. Then during the HIGH current phase of the charging cycle, the charging current I is maintained at a HIGH value until the charge acceptance ability of the battery is reached, at which time the charging current is regulated to complete or finish the charging of the battery.

In step 109, the "RAMP UP" status is checked. If the charger 10 is in RAMP UP mode, then a Ramp Up procedure 300 is called in step 111. The function of the Ramp Up procedure 300 is to increase or ramp the charging current I to the maximum value $I_{Max}$ allowed for the particular battery being charged. The maximum current $I_{Max}$ is conveniently stored in the Parameter table. The Ramp Up procedure 300 is shown in more detail in FIG. 3.

Figure 3:
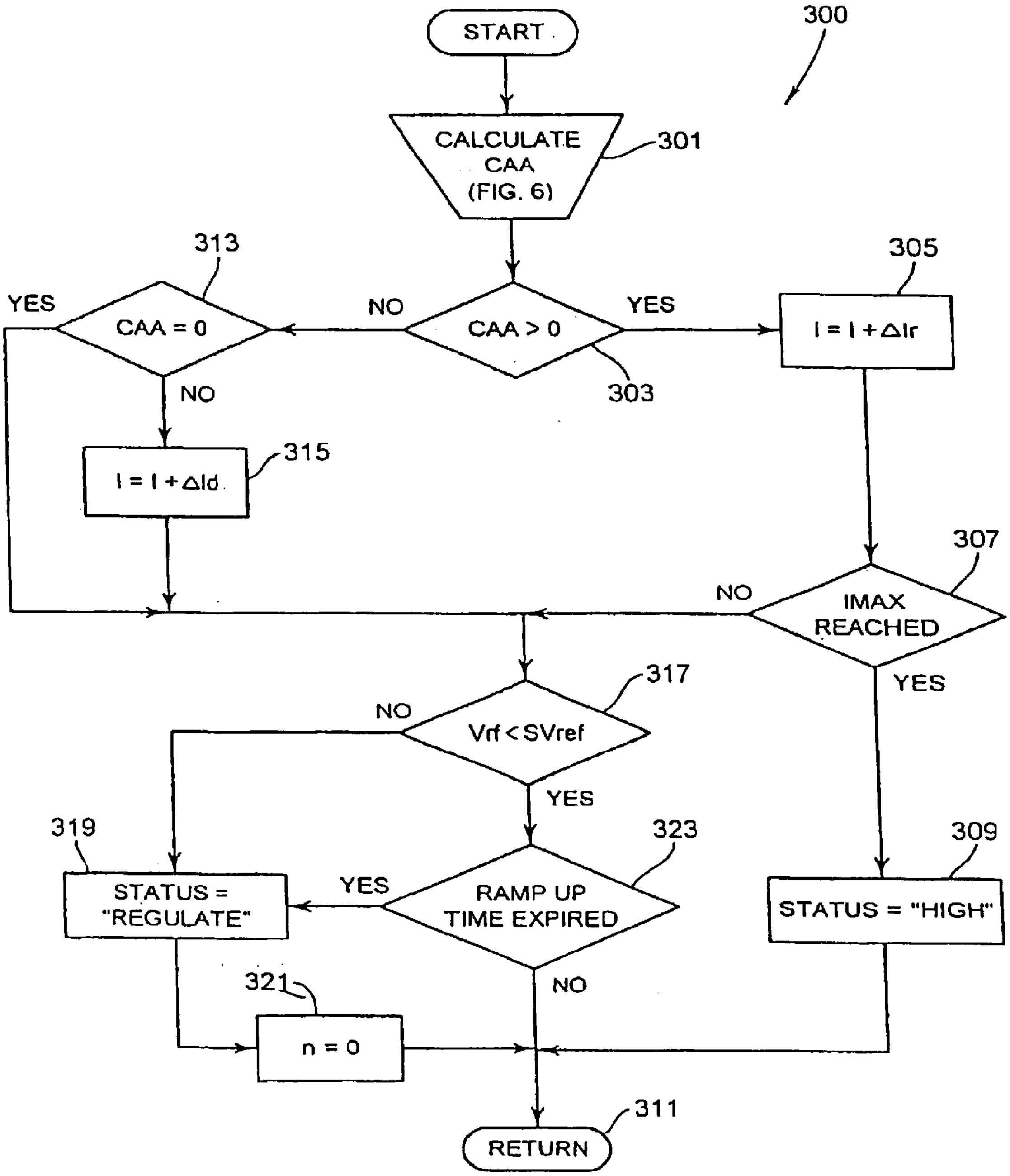
FIG. 3 is a flow chart of a ramp-up function for the charging method of FIG. 2.
Figure 9:
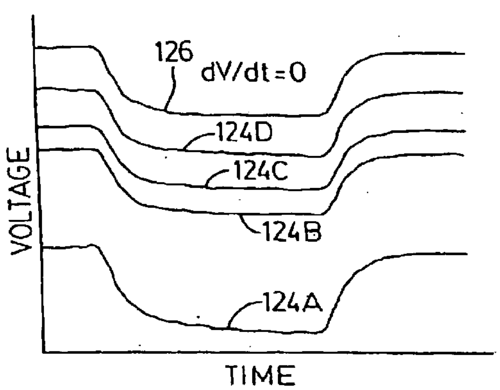
FIG. 9 is a graph showing voltage profiles characteristic of a second class of batteries.
Figure 10:
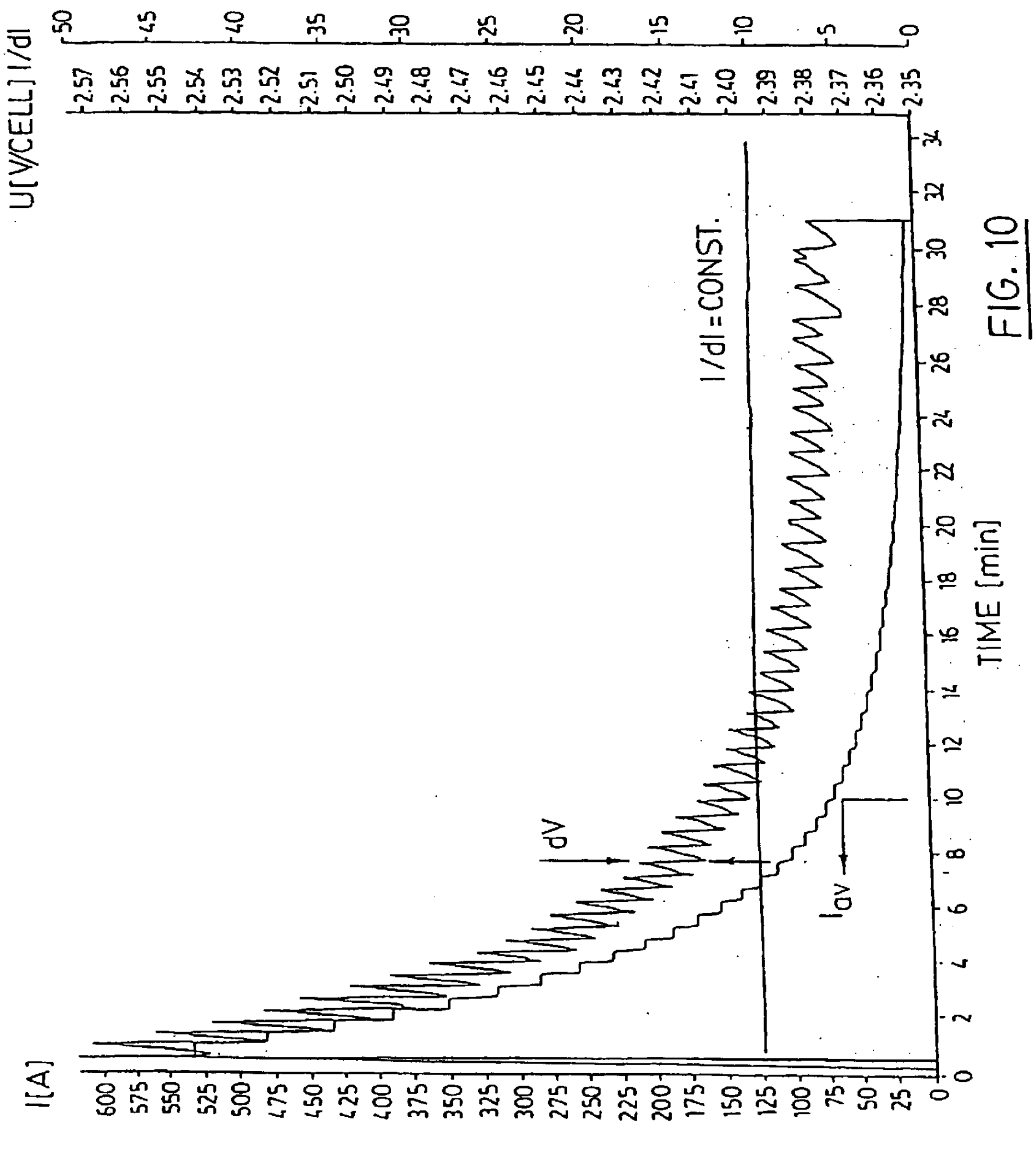
FIG. 10 is a graph showing control of the charging current based on the terminal voltage profile.

Referring to FIG. 3, the first operation performed by the Ramp-Up procedure 300 is to calculate the charge acceptance ability CAA of the battery being charged. In step 301, a charge acceptance ability procedure 400 is called, and the charge acceptance ability procedure 400 is shown in more detail in FIG. 6. The function of the charge acceptance procedure 400 is to determine whether the charge acceptance ability of the battery has been reached. If the charge acceptance ability of the battery has not been reached, then the charging current I can be increased to continue the fast charging of the battery. According to this aspect of the invention, the charge acceptance ability CAA is determined from the slope dV/dt of the terminal voltage profile (FIGS. 9 and 10).

Figure 6:
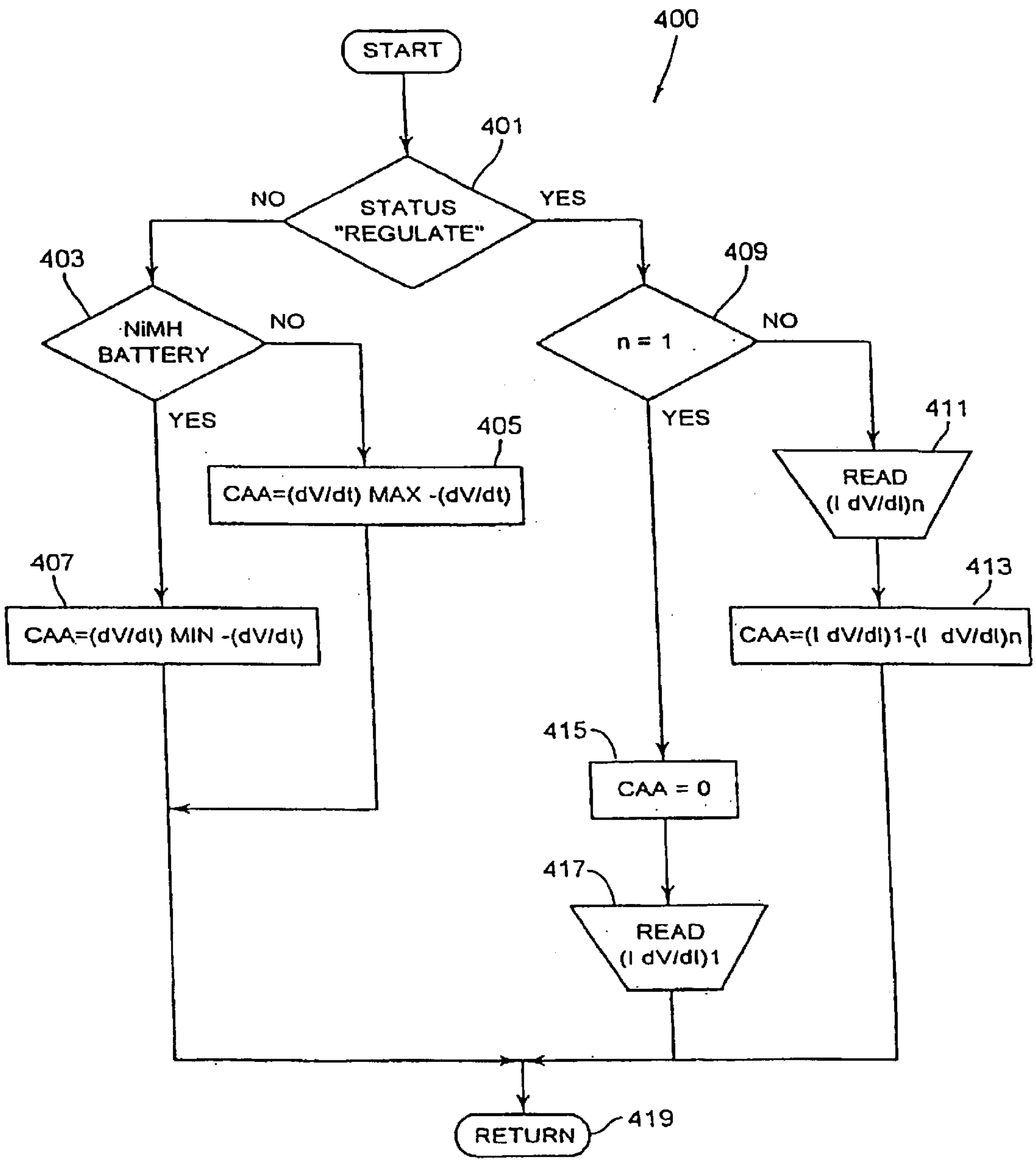
FIG. 6 is a flow chart of the method steps for determining charge acceptance ability according to the present invention.

As shown in FIG. 6, the charge acceptance ability procedure 400 first checks the mode of operation in step 401, and more specifically, if the mode is REGULATE. If the mode of operation is not REGULATE, then the charger 10 is in HIGH CURRENT or RAMP UP mode and the battery type is next checked in step 403. As described above, the charging method according to the present invention distinguishes between Group I and Group II batteries and uses the slope dV/dt of the terminal voltage profile to ascertain the charge acceptance ability CAA of the battery. If the battery is a nickel-metal hydride (NiMH) battery in Group II, then the slope dV/dt for the terminal voltage profile approaches zero (FIG. 9) when the charge acceptance ability is reached. Conversely, for Group I batteries the slope, dV/dt of the terminal voltage profile reaches a maximum (FIG. 8) when the charge acceptance ability is reached. For a Group I battery, the charge acceptance ability CAA is calculated in step 405 by taking the difference between the maximum value for the slope $dV/dt_{Max}$, and the present slope dV/dt for the terminal voltage profile. The maximum value for the slope $dV/dt_{Max,}$ is conveniently stored in the Parameter table. As the battery is charged, the difference between the maximum slope $dV/dt_{Max}$ and the actual slope dV/dt will become smaller, and the charge acceptance ability is reached when CAA=0 in step 405.

Figure 7:
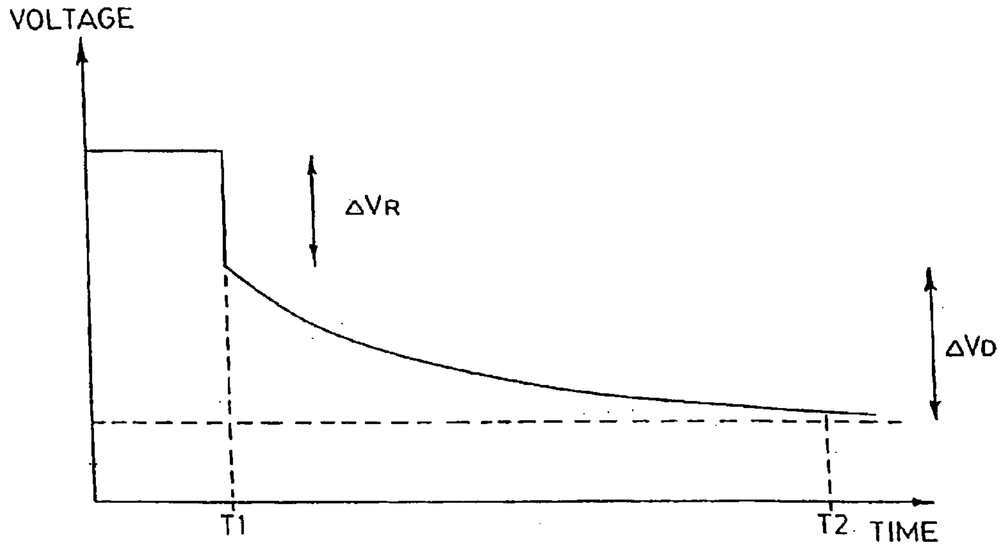
FIG. 7 is a graph showing the relationship between the Ohmic resistance voltage drop and the voltage drop resulting from ion migration through the electrolyte concentration boundary layer.

The terminal voltage profile is measured during a variation interval in the charging current or calculated from the terminal voltage by means of charging current I and battery internal resistance when the current is not interrupted. As shown in FIG. 7, when the charging current I is interrupted or varied, there is a drop in the terminal voltage (represented by the curve in FIG. 7) comprising two components or phases: voltage $V_R$ and voltage $V_D$. The voltage $V_R$ is a voltage transpose and occurs almost immediately after the charging current I is varied, indicated at time $T_1$ in FIG. 7. The voltage transpose $\Delta V_R$, is caused almost entirely by Ohmic losses inside the battery (e.g. Ohmic losses in the posts, plates, intercell wiring and the like). The second component comprises a voltage charge $\Delta V_D$, in the terminal voltage. The voltage charge $\Delta V_D$ has a slope dV/dt and according to this aspect of the invention the slope dV/dt of the terminal voltage profile is utilized to determine the charge acceptance ability of the battery.

Referring back to FIG. 6, for a Group II battery, i.e. nickel-metal hydride, the charge acceptance ability CAA is calculated in step 407. According to this aspect of the invention, the slope dV/dt of the terminal voltage profile approaches a minimum when the battery is charged. In step 407, the charge acceptance ability CAA is calculated as the difference between the minimum slope $dV/dt_{MIN}$ and the current slope dV/dt of the terminal voltage profile. For a NiMH battery, the difference between the minimum slope $dV/dt_{MIN}$ and the slope dV/dt will approach zero.

Referring to FIG. 6. if the charger is operating in LOW CURRENT MODE, i.e. STATUS=REGULATE is TRUE, then a counter flag "n" is checked in step 409. In REGULATE mode, the charge acceptance ability CAA is monitored in order to maintain the charging current I at an optimal level. (The counter flag n is set by the Regulate procedure as will be described below). For the first pass after the REGULATE state has commenced the flag n will be one and the procedure 400 goes to step 415. In step 411, a parameter I·dV/dI is updated. The parameter I·dV/dI represents the step changes in the charging current I during the regulation phase and the resulting changes in the voltage dV. The relationship between the step decreases in the charging current I and the changes dV in the terminal voltage is shown in FIG. 10. In order to simplify the calculation, the step size for decreasing the charging current I is selected so that I/dI is a constant.

Accordingly then in step 411, only the change in voltage dV needs to be measured. Next in step 413, the charge acceptance ability CAA is calculated as the difference between the first reading $(I \cdot dV/dI)_1$ and the present reading $(I \cdot dV/dI)_n$. The first reading $(I \cdot dV/dI)_1$ corresponds to the state where CAA is zero, i.e. the battery charge acceptance ability had been reached. If the charge acceptance ability value calculated in step 413 is not zero, it means that the battery is not fully charged, and the setpoint can be increased. If the counter flag n is TRUE (i.e. n=1 in step 409), then the charge acceptance ability CAA is set to zero in step 415 to indicate that the battery is charged and the reading $(I \cdot dV/dI)_1$ is updated in step 417. Control then returns to the calling procedure at step 419.

Referring back to FIG. 3 and the Ramp-Up procedure 300, at step 303 the procedure 300 checks if the charge acceptance ability CAA is greater than zero. If the CAA is greater than zero, then the battery is not fully charged and the charge current I can be increased or ramped-up further. In step 305, the charging current I is incrementally increased. In step 307, the setting for charging current I is compared to the maximum allowable current setting $I_{max}$ (stored in the Parameter table). If the maximum value for the charging current I is reached, then the status flag is set to HIGH in step 309 to indicate that the charger 10 is operating at high current, and therefore the ramp-up of the charging current I is complete. In step 311, the Ramp-Up procedure 300 returns to the charger control 100.

As shown in FIG. 3, if the charge acceptance ability CAA is not greater than zero, then the Ramp-Up procedure 300 checks if the charge acceptance ability CAA is equal to zero in step 313. If the charge acceptance ability CAA is not equal to zero, i.e. negative, then the charge acceptance ability for the battery has been exceeded and accordingly the charging current I is reduced in step 315. If the charge acceptance ability CAA is zero (or the maximum charging current has not been reached—step 307 described above), then the Ramp-Up function 300 compares the reading for terminal (e.g. resistance free) voltage $V_{rf}$ (i.e. taken during a variation in the charging current I) to the setpoint voltage $SV_{ref}$ in step 317. If the voltage reading $V_{rf}$ exceeds the setpoint voltage $SV_{ref}$, then the Ramp-Up operation should be terminated and the status flag is set to "Regulate" in step 319, and the counter flag "n" is set to zero in step 321 to indicate that the Regulate phase has been commenced. (The counter flag "n" is used by the charge acceptance procedure 400 as described above.) If the terminal voltage $V_{rf}$ is still less than the setpoint voltage $SV_{ref}$, then the Ramp-Up procedure 300 checks if the time for ramping-up the charging current I has expired in step 323. For example, if the ramp-up current is not reached within a predetermined time, then there could be a fault and such a condition should be flagged. The Ramp-Up procedure 300 then returns to the calling procedure in step 311.

Figure 4:
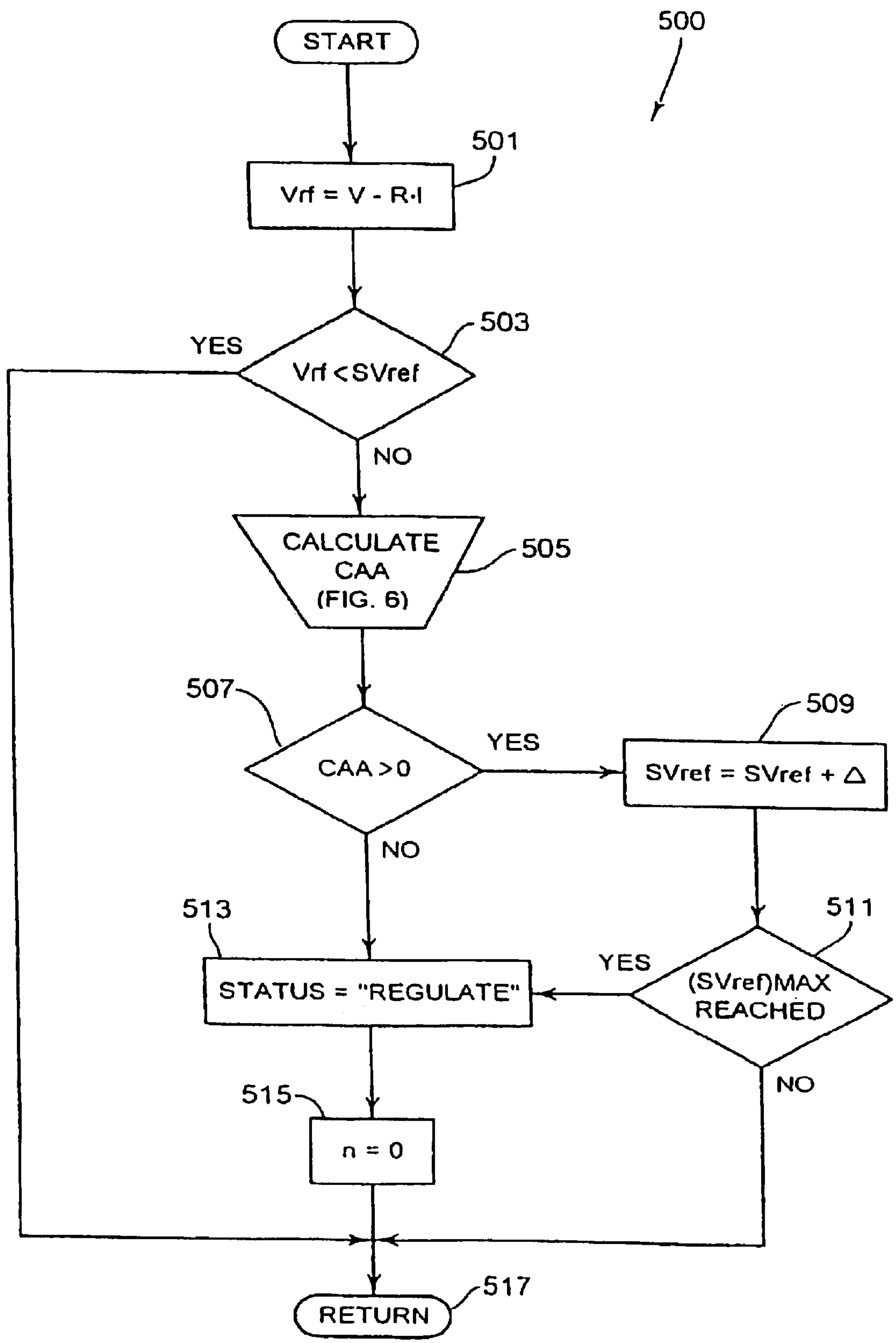
FIG. 4 is a flow chart of a high current control method for the charging method of FIG. 2.

Referring back to FIG. 2, the charging control program 102 checks if the status has been set to HIGH in step 113. The status is set to HIGH by the Ramp-Up procedure 300 when the maximum charging current $I_{max}$ is reached as described above. If status is HIGH, then the charging control program 100 calls a High Current Control procedure 500 in step 115. Referring to FIG. 4, the High Current Control procedure 500 controls the charging current I once it has been ramped-up to the maximum value $I_{max}$. As shown in FIG. 4, the first operation involves updating the value for the terminal voltage $V_{rf}$ in step 501. The terminal voltage $V_{rf}$ is updated in step 501 based on the current values obtained by the data acquisition module 201 for the voltage V, current I, and resistance R. The terminal or resistance free voltage is calculated according to the expression:

$$V_{RF} = V_{Hi} - \frac{I_{Hi}(V_{Hi} - V_{Low})}{(I_{Hi} - I_{Low})}$$

and the resistance R is calculated according to the expression:

$$R=(V_{Hi}-V_{Low})(I_{Hi}-I_{Low})$$

The readings for voltage and current are taken when the charging current I is interrupted or varied. In the context of the present invention, the variation in the charging current I provides a window to measure the voltage and current parameters in order to calculate the terminal, i.e. resistance free, voltage $V_{rf}$ for the battery. The variations in the charging current I are regulated by the controller 12 and the programmable power supply 16 (FIG. 11). Suitable variations in the current I include a step change (e.g. the current is turned off, decreased to a non-zero value or increased), a ramped change, a sinusoidal change, an exponential change, a logarithmic change.

Next in step 503, the High Current Control procedure 500 checks if the value for the terminal voltage $V_{rf}$ is less than the setpoint voltage $SV_{ref}$. If the voltage $V_{rf}$ is less than the setpoint voltage $SV_{ref}$, then the charge acceptance ability CAA of the battery is updated in step 505. The charge acceptance ability CAA for the battery is calculated as described above with reference to FIG. 6. If the charge acceptance voltage CAA is greater than zero (step 507), then the battery can take more charging current and accordingly the setpoint reference voltage $SV_{ref}$ is increased in step 509. According to this aspect of the invention, the setpoint voltage $SV_{ref}$ is optimally adjusted using the charge acceptance ability CAA of the battery.

As a safety check, the setpoint voltage $SV_{ref}$ adjusted in step 509 is compared to a maximum setpoint reference voltage $(SV_{ref})_{MAX}$ in step 511. If the maximum setpoint voltage $(SV_{ref})_{MAX}$ has been reached, then further charging could damage the battery so the charging status is set to REGULATE in step 513. Similarly, if the charge acceptance ability CAA is not greater than zero (step 507), then the charge status is set to REGULATE in step 513. Next, in step 515, the counter flag "n" is reset to zero, and High current control procedure returns (step 517) to the charging control module 102.

Referring back to FIG. 2, the charging control program 102 next checks if the status is set for the REGULATE operation in step 117. (As described above, the High Current Control procedure 500 sets the status to REGULATE.) In step 119, a Charging Current Regulate procedure is called by the charging control program 102. The function of the Charging Current Regulate procedure 600 is to regulate the charging current I in order to finish or complete the charging of the battery.

Figure 5:
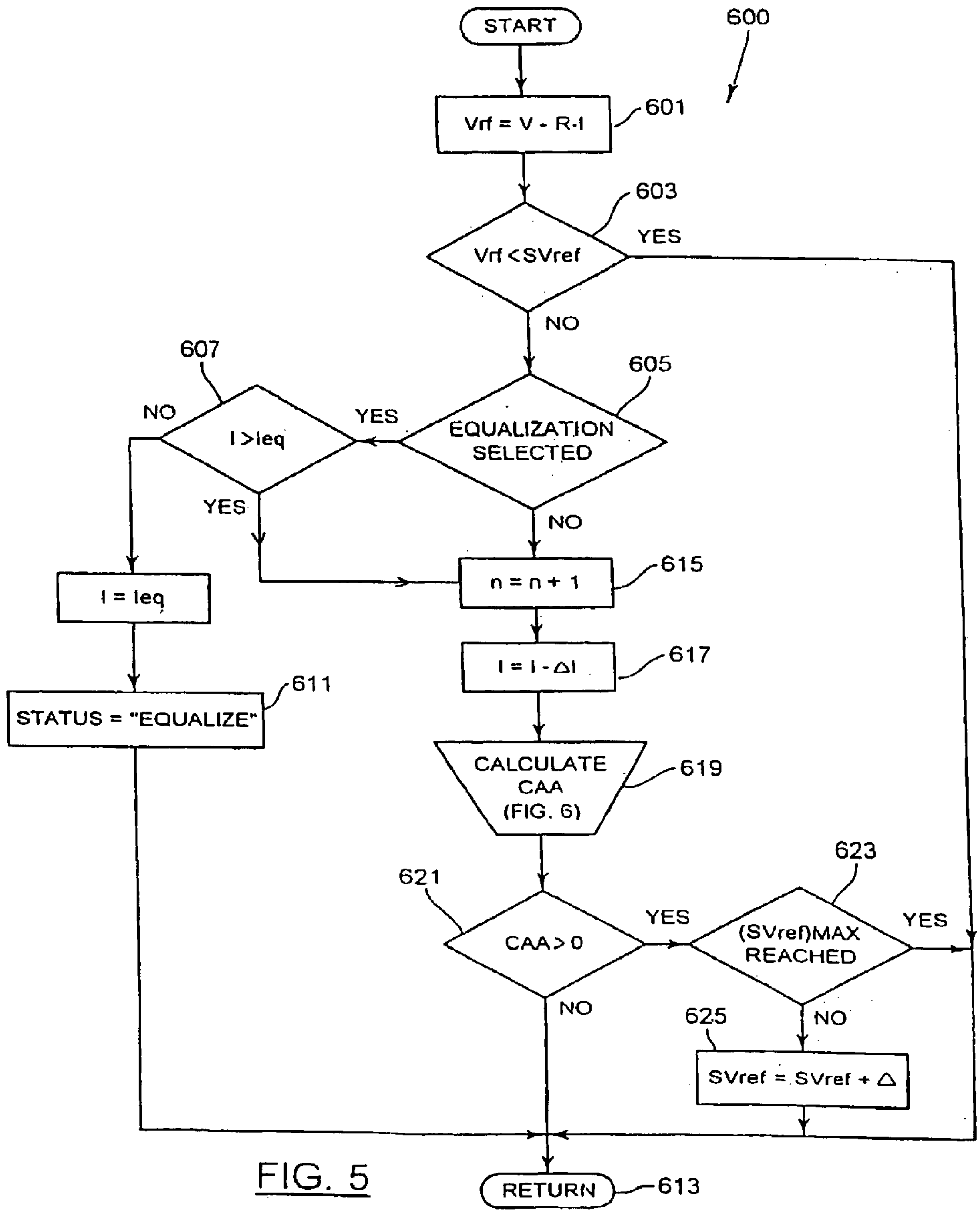
FIG. 5 is a flow chart of a current regulation method for the charging method of FIG. 2.

Reference is made in FIG. 5 which shows the Current Regulate procedure 600 in more detail. In step 601, the Regulate procedure 601 calculates the current value for the terminal, i.e. resistance free, voltage $V_{rf}$ using the voltage, current and resistance readings obtained by the data acquisition module 201 (FIG. 2). Next in step 603, the updated terminal voltage $V_{rf}$ is compared to the setpoint voltage $SV_{ref}$. If the voltage is greater than the setpoint voltage $SV_{ref}$, then the Current Regulate procedure 600 ascertains if an equalization operation is to be performed in step 605. An equalization operation involves overcharging the battery at the end of a charge cycle with an elevated charging current I. The purpose of the elevated charging current is to bring all the cells in the battery pack to a full charge. The equalization operation is typically performed once every fifty charge cycles for a battery pack. If an equalization operation is being conducted, the charging current I is compared to the equalization current value $I_{eq}$ in step 607. If the charging current I is less than the predetermined equalization current $I_{eq}$, then the charging current I is set to the equalization value $I_{eq}$ in step 609 and the charge status is set to EQUALIZE in step 611. The Regulate procedure 600 then returns to the charging control program 102 in step 613.

Referring to FIG. 5, if equalization has not been selected (step 605) or the charging current I exceeds the equalization current (step 607), then the counter flag "n" is advanced in step 615. Next in step 617, the charging current I is incrementally decreased because the setpoint voltage has been reached. In step 619 the charge acceptance ability CAA is calculated by calling the charge acceptance procedure 400 (as described above with reference to FIG. 6). The step change in the charging current I in step 617 provides a convenient variation in the charging current I for determining the slope dV/dt. If the charge acceptance ability CAA as determined in step 619 is greater than zero (step 621), then the battery can take more charge and the setpoint voltage $SV_{ref}$ is checked in step 623. If the setpoint voltage $SV_{ref}$ is already at the maximum set point reference voltage $(SV_{ref})_{max}$, then the procedure 600 returns control to the charging control program 102 in step 613. On the other hand, if the maximum setpoint voltage $(SV_{ref})_{max}$ has not been reached, then the setpoint reference voltage $SV_{ref}$ is incrementally increased in step 625, and control is returned to the charging control program 102.

Referring back to FIG. 2, next in step 121, the end of the charging cycle is checked. The end of the charging cycle is determined by looking at one or more selected parameters. The parameters include the elapsed charge time, the value for the Coulombic charge Q, the value for charging current compared to the minimum charging current $I_{MIN}$, and the rate of change in the battery voltage dV/dt. For example, if the charging current being applied to the battery has tapered to the minimum value $I_{MIN}$, then it is assumed that the battery has been charged, i.e. it cannot accept further charge. Similarly, if the rate of change of battery voltage is essentially zero, then it is assumed that the battery is charged.

On the basis of an end of charge condition in step 121, a normal end of charge sequence is initiated in step 123. If a finishing or equalization charge (FIG. 5) is being applied, then the end of charge corresponds to the termination of the finishing charge sequence. The end of charge sequence (step 123) includes an orderly shutdown of the programmable power supply 16 (FIG. 11), i.e. the charging current I, and other hardware devices, followed by displaying a notification message on panels 14.

If the end of the cycle has not been reached, the charging process continues and the safety limits are checked in step 125. The safety check in step 125 ensures that the charging cycle is still proceeding within the prescribed safety limits. The parameters checked in step 125 include the maximum allowable voltage $V_{MAX}$, the minimum voltage $V_{MIN}$, the maximum allowable battery temperature $T_{Max}$, the maximum allowable Coulombic charge $Q_{Max}$, the battery internal resistance R, and the battery pressure P. The maximum allowable values for these parameters depend on the electrochemical characteristics of the battery being charged, and may be conveniently stored in the Parameter table.

If one of the safety limits is exceeded in step 125, a fault condition is entered in step 127, and the charging cycle is terminated in step 129. The termination of the charging cycle is indicated on the display panels 14.

On the other hand, if the safety limits have not been exceeded, the charging cycle continues and the process control parameters and data are updated in step 131. The control parameters and data control the magnitude and application (i.e. variation) of the charging current being applied to the battery. The control parameters are then passed to the real time control module 202 in order to control the hardware devices, e.g. the programmable power supply 16.

Referring back to FIG. 2, the charging control program checks if one of three overcharge current pulses according to overcharge instructions D1, D2 and D3 should be supplied to the battery 20 in step 137. In step 137, a Destratificafion Procedure 700 is called by the charging control program 102. The function of the Destratification Procedure 700 is to periodically augment the charging current I for short periods.

The Destratification Procedure 700 provides a method of acid agitation that can be incorporated into a rapid charge algorithm. A few times during rapid recharge of the lead-acid battery 20, a controlled brief overcharge pulse is deployed to mix the electrolyte in the battery 20. Mixing is most effective when deployed between 60 and 100% SOC. The overcharge is carried out by increasing the current supplied to the battery for 0.5 to 5 minutes. Preferably, the overcharge pulses are delivered for between 2 to 2.5 minutes. Measurements of the electrolyte specific gravity have shown that a single overcharge pulse of the above mentioned duration and intensity can sufficiently mix the electrolyte. Preferably, this procedure is repeated 2 to 3 times during each charge cycle at around 60, 80 and 95% SOC. Alternatively, in embodiments in which charging current is adjusted based on CAA, the overcharge pulse may be delivered when the current has tapered down to a certain percentage of $I_{max}$—for example, at 50% $I_{max}$, 20% $I_{max}$ and 10% $I_{max}$.

After the overcharge pulse is delivered, the current is reduced to below one tenth of battery capacity to stabilize the voltage of the battery. The need to stabilize the voltage of the battery arises from the heterogeneous nature of the electrochemical reactions occurring in the battery during charging and discharging. Specifically, these reactions typically occur in five steps:

1. Diffusion of reacting species through the boundary layer to the plate surface.
2. Adsorption of reactants at the plate surface.
3. Chemical reaction at the surface of the plate.
4. Incorporation of solid products into the plate crystal structure.
5. Diffusion of reaction products through the boundary layer away from the plates.

Termination of current supplied to the battery does not result in immediate cessation of all of the reactions driven by the current. Specifically, steps 1, 2, 4 and 5 will all continue at a diminishing rate after the current is terminated. With respect to step 3, only the electrochemical portion of the surface chemical reactions stops immediately on cessation of the current. The non-electrochemical reactions in step 3 will continue at a diminishing rate. Thus, after the overcharge current is terminated at least 5 to 60 seconds must be allowed for all of the reactions to subside, and recommencement of charging should preferably be delayed for this period. In the preferred embodiment, the current is increased back up to the usual charging current that tracks the CAA after at least five seconds and preferably after about thirty seconds.

The timing, duration, and magnitude of the overcharge pulse, as well as the duration and magnitude of the voltage stabilizing current that follows, are specified in the overcharge instructions $D_1$, $D_2$ and $D_3$ for the first, second and third overcharges respectively. In the specific rapid recharging method according to the preferred embodiment, the charge current $I_C$ normally tracks the battery charge acceptance CAA at least for the latter part of the charging cycle. During the early part of the charging cycle, the charger is in RAMP UP mode such that the charging current is set at $I_{Max}$. $I_{Max}$ will normally be the maximum current that the battery charger 10 can provide. In the latter part of the recharge cycle, when the overcharge pules are delivered, the CAA of the battery 20 will drop below $I_{Max}$, at which point $I_C$ will track CAA. The current delivered to the battery 20 during the three brief periods of overcharge will equal the CAA at that time plus in amperes between one fifth and one twentieth of the battery's capacity in ampere hours (the hour component of the battery capacity should be disregarded in this calculation). The total currents delivered during the first, second and third overcharge periods are designated $I_{D1}$, $I_{D2}$, and $I_{D3}$ respectively.

Figure 12:
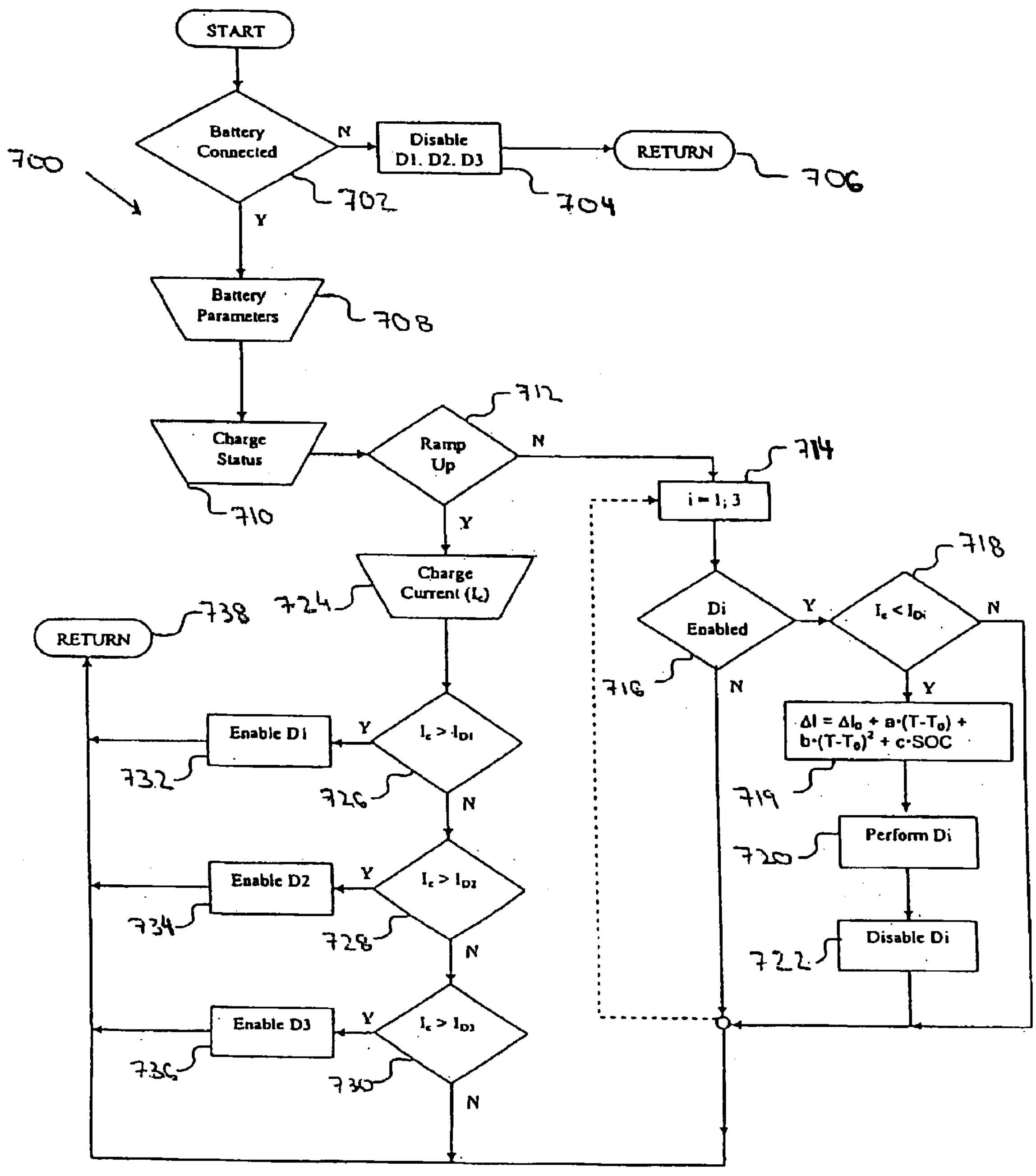
FIG. 12 is a flow chart of a destratification function of the charging method of FIG. 2.

These overcharge pulses will not be supplied to the battery during the RAMP UP mode of recharging as the charger current $I_C$ will be at $I_{max}$. However, at this point during recharging, the overcharge instructions D1, D2 and D3 are enabled in steps 732, 734 and 736 respectively (FIG. 12). After the RAMP UP mode has ended, these overcharges will be successively delivered to the battery 20 in step 720.

The amount of overcharge delivered by this method is minimal. Typically, it is in the order of 1% of total charge returned, which is significantly less than the 10 to 20% overcharge required by the standard method. The total overcharge delivered should not be more than 5% of total charge returned. The time required to perform an overcharge is shortened from hours to minutes.

Referring to FIG. 12, Destratification Procedure 700 queries whether the battery 20 is connected to the battery charger 10 in step 702. If the battery 20 is not connected to the battery charger 10, then step 702 returns the answer "no" and Destratification Procedure proceeds to step 704 in which overcharge instructions D1, D2 and D3 are disabled. The Destratification Procedure 700 then returns to the charging control program 102 in step 706.

If Destratification Procedure 700 returns the answer yes in step 702, then the procedure next proceeds to step 708 in which the battery parameters are checked. Then, procedure 700 checks the charge status of the battery 20 in step 710. In step 712, Destratification Procedure 700 queries whether the charger 10 is in RAMP UP mode. If the charger 10 is in RAMP UP mode then the Destratification Procedure next proceeds to step 724. In this step, the charge current is determined. Step 726 then queries whether the charge current exceeds the first overcharge current $I_{D1}$. If the charge current $I_C$ is greater than $I_{D1}$ then the Destratification Procedure next proceeds to step 732 in which D1 is enabled. If the charge current $I_C$ is not greater than $I_{D1}$, then Destratification Procedure 700 proceeds to step 728. In step 728, procedure 700 checks whether charge current $I_C$ is greater than the second overcharge current $I_{D2}$. If step 728 returns the answer yes, then the Destratification Procedure 700 goes to step 734 in which overcharge pulse instructions D2 are enabled. If charge current $I_C$ is not greater than overcharge pulse $I_{D2}$, then Destratification Procedure 700 goes to step 730. Step 730 returns the answer yes if the charge current exceeds the third overcharge pulse $I_{D3}$, and otherwise returns the answer no. If $I_C$ is greater than $I_{D3}$, then Destratification Procedure 700 proceeds to step 736 in which overcharge instructions D3 are enabled. Destratification Procedure then returns to the charging control program 102 in step 738.

Referring back to step 712, if the battery charger is not currently in RAMP UP mode then the Destratification Procedure 700 goes to step 714. On the first time through step 714 during a particular run of Procedure 700, counter I will be set equal to 1. The Destratification Procedure 700 next proceeds to step 716, which queries whether the $I_{th}$ overcharge instructions $D_i$ are enabled. All of the destratification pulses $D_1$, $D_2$ and $D_3$ will initially be enabled provided that $I_{max}$ is greater than each of overcharge pulses $I_{D1}$, $I_{D2}$ and $I_{D3}$. However, after each overcharge is delivered, the particular overcharge instructions for that overcharge will be disabled in step 722. Assuming that, on the first run through, $D_1$ is enabled, the Destratification Procedure 700 next proceeds to step 718, which queries whether charge current $I_C$ is less than overcharge pulse $I_{D1}$. If step 718 returns the answer no, then Destratification Procedure will return to the calling procedure in step 738. If step 718 returns the answer yes, then Destratification Procedure 700 will next proceed to step 719. In step 719, a overcharge increment ΔI, used to add to the charging current to obtain the overcharge current, is adjusted based on the temperature of the battery relative to a reference temperature, the SOC of the battery and on empirical constants that vary from battery to battery. Specifically, a default overcharge increment $\Delta I_o$ will initially be set to be a charge increment sufficient to raise $I_{D1}$ the desired amount above the CAA. The actual overcharge increment ΔI is then calculated from the default overcharge increment $\Delta I_o$ using the formula shown. In the formula, the reference temperature $T_o$ is subtracted from the actual T as the amount of overcharge required will vary depending on the temperature of the battery. Similarly, the amount of overcharge required will vary depending on the SOC of the battery. In the preferred embodiment, the reference temperature $T_o$ is 25 degrees centigrade and the empirical constants a, b and c vary as follows: ($-10 \leqq a \leqq 10$; $-0.1 \leqq b \leqq 0.1$; $0 \leqq c \leqq 1$). Following step 719, Destratification Procedure 700 proceeds to step 720. In step 720 the overcharge pulse $I_{D1}$ is delivered to the battery 20. Then, in step 722, overcharge instructions $D_1$ are disabled. After step 722, Destratification Procedure 700 returns to the calling procedure at step 738.

The next time the Destratification Procedure 700 is invoked by step 137 of the charging method of FIG. 2, the first overcharge instructions $D_1$ will be disabled. Thus, when Procedure 700 reaches step 716, and i is set equal to 1 in step 714, step 716 will return the answer "no" as $D_1$ was previously disabled. Then Procedure 700 will return to step 714, where i is set equal to 2, and step 716 will then return the answer "yes" as $D_2$ has not yet been disabled. Similarly, after $D_1$ and $D_2$ have been disabled, Procedure 700 will loop back to steps 714 and 716 twice before proceeding to step 718 to query whether $I_c$ is greater than $I_{D3}$. If step 718 returns the answer yes, then overcharge increment ΔI will be determined in step 719 and overcharge instructions D3 will be executed in step 720 and then disabled in step 722, before the Procedure 700 returns to the charging control program 102 in step 138. At that point, the destratification function will be complete for that recharging of the battery.

The present invention may be embodied in other specific forms without departing from the spirit or essential characteristics thereof. In particular, while the destratification function has been described within the context of a particular rapid recharging method, it will be appreciated by those skilled in the art that the destratification function may be advantageously combined with other rapid recharging methods. Furthermore, while the overcharging method described has involved interrupting the charging current to supply overcharge currents during time intervals, it will be appreciated by those skilled in the art that the overcharge current may also be supplied continuously during charging. Therefore, the presently discussed embodiments are considered to be illustrative and not restrictive, the scope of the invention being indicated by the appended claims rather than the foregoing description, and all changes which come within the meaning and range of the fluency of the claims are therefore intended to be embraced therein.

What is claimed is:

1. An apparatus for charging a rechargeable lead-acid battery, said apparatus comprising:

generator means for generating a charging current for charging the battery, and an overcharge current increment to be added to the charging current to yield an overcharge current; and, controller means for controlling said generator means, said controller means including (a) feedback means for determining at least one of a charge acceptance ability and a state of charge of the rechargeable lead-acid battery during recharging;

(b) overcharge instruction means for determining the overcharge current, the overcharge current exceeding the charge acceptance ability of the battery; and, (c) current control means for controlling the generator to supply the charging current and the overcharge current increment, the current control means being operable to deliver the overcharge current to the battery during charging; and wherein the overcharge instruction means is operable to determine an overcharge duration and an overcharge time;

the current control means is operable to deliver the overcharge current to the battery for the overcharge duration at the overcharge time; and the overcharge duration is between a half minute and five minutes, and the overcharge current exceeds the charge acceptance ability of the lead-acid battery by less than one fifth of the battery capacity and by more than one twentieth of the battery capacity.

2. An apparatus for charging a rechargeable lead-acid battery, said apparatus comprising:

generator means for generating a charging current for charging the battery, and an overcharge current increment to be added to the charging current to yield an overcharge current; and, controller means for controlling said generator means, said controller means including (a) feedback means for determining at least one of a charge acceptance ability and a state of charge of the rechargeable lead-acid battery during recharging;

(b) overcharge instruction means for determining the overcharge current, the overcharge current exceeding the charge acceptance ability of the battery; and, (c) current control means for controlling the generator to supply the charging current and the overcharge current increment, the current control means being operable to deliver the overcharge current to the battery during charging; and wherein the overcharge instruction means is operable to determine an overcharge duration and an overcharge time;

the current control means is operable to deliver the overcharge current to the battery for the overcharge duration at the overcharge time;

the overcharge instruction means determines a plurality of overcharge times, an associated overcharge current for each overcharge time, and an associated overcharge duration for each overcharge time;

the associated overcharge duration for each overcharge time being between a half minute and five minutes; and, the associated overcharge current for each overcharge time exceeds the charge acceptance ability of the lead-acid battery at the overcharge time by less than one fifth of the battery capacity and by more than one twentieth of the battery capacity.

3. The apparatus as defined in claim 2 wherein the plurality of overcharge times are after the state of charge of the battery is at least 60% and before the state of charge of the battery is 100%.

4. The apparatus as defined in claim 3 wherein after the associated overcharge duration for each overcharge time has elapsed, the generator means is operable to supply an associated voltage-stabilizing current to the battery for an associated voltage-stabilizing interval before the charging current is restored, the associated voltage-stabilizing current for each overcharge time being less than a tenth of the battery capacity.

5. The apparatus as defined in claim 4 wherein the associated voltage-stabilizing interval for each overcharge time is at least five seconds.

6. The apparatus as defined in claim 4 wherein a total overcharge delivered during charging of the battery is less than 5% of a total charge provided to the battery during recharging.

7. The apparatus as defined in claim 3 further comprising temperature sensing means for determining an internal temperature of the battery, wherein the overcharge instruction means is operable to adjust the overcharge current depending on the internal temperature of the battery.

8. A method for recharging a rechargeable lead-acid battery, the method comprising:

(a) generating a charging current for charging the battery;

(b) supplying the charging current to the battery;

(c) determining at least one of a charge acceptance ability and a state of charge of the rechargeable lead-acid battery;

(d) determining the overcharge current, the overcharge current exceeding the charge acceptance ability of the battery;

(e) determining an overcharge current increment to be added to the charging current to yield the overcharge current; and (f) during step (b), supplying the overcharge current increment to the battery; and wherein an overcharge duration and an overcharge time is determined;

the overcharge current is supplied to the battery for the overcharge duration at the overcharge time; and the overcharge duration is between a half minute and five minutes, and the overcharge current exceeds the charge acceptance ability of the lead-acid battery by less than one fifth of the battery capacity and by more than one twentieth of the battery capacity.

9. A method for recharging a rechargeable lead-acid battery, the method comprising:

(a) generating a charging current for charging the battery;

(b) supplying the charging current to the battery;

(c) determining at least one of a charge acceptance ability and a state of charge of the rechargeable lead-acid battery;

(d) determining the overcharge current, the overcharge current exceeding the charge acceptance ability of the battery;

(e) determining an overcharge current increment to be added to the charging current to yield the overcharge current; and (f) during step (b), supplying the overcharge current increment to the battery; and wherein an overcharge duration and an overcharge time is determined;

the overcharge current is supplied to the battery for the overcharge duration at the overcharge time;

a plurality of overcharge times, an associated overcharge current for each overcharge time, and an associated overcharge duration for each overcharge time, are determined;

the associated overcharge duration for each overcharge time is between a half minute and five minutes; and, the associated overcharge current for each overcharge time exceeds the charge acceptance ability of the lead-acid battery at the overcharge time by less than one fifth of the battery capacity and by more than one twentieth of the battery capacity.

10. The method as defined in claim 9 wherein the plurality of overcharge times are after the state of charge of the battery is at least 60% and before the state of charge of the battery is 100%.

11. The method as defined in claim 10 wherein after the associated overcharge duration for each overcharge time has elapsed, an associated voltage-stabilizing current is delivered to the battery for an associated voltage-stabilizg interval before the charging current is restored, the associated voltage-stabilizing current for each overcharge time being less than a tenth of the battery capacity.

12. The method as defined in claim 11 wherein the associated voltage-stabilizing interval for each overcharge time is at least five seconds.

13. The method as defined in claim 11 wherein a total overcharge delivered during charging of the battery is less than 5% of a total charge provided to the battery during recharging.

14. The method as defined in claim 10 further comprising determining an internal temperature of the battery and adjusting the overcharge current depending on the internal temperature of the battery.

15. An apparatus for charging a rechargeable lead-acid battery, said apparatus comprising:

generator means for generating a charging current for charging the battery, and an overcharge current increment to be added to the charging current to yield an overcharge current; and, controller means for controlling said generator means, said controller means including (a) feed back means for determining at least one of a charge acceptance ability and a state of charge of the rechargeable lead-acid battery during recharging;

(b) overcharge instruction means for determining the overcharge current, the overcharge current exceeding the charge acceptance ability of the battery; and, (c) current control means for controlling the generator to supply the charging current and the overcharge current increment, the current control means being operable to deliver the overcharge current to the battery during charging.

16. The apparatus as defined in claim 15 wherein the overcharge instruction means is operable to determine an overcharge duration and an overcharge time; and, the current control means is operable to deliver the overcharge current to the battery for the overcharge duration at the overcharge time.

17. The apparatus as defined in claim 16 wherein the overcharge time is determined to be after the state of charge of the lead-acid battery reaches 60%.

18. A method for recharging a rechargeable lead-acid battery, the method comprising:

(a) generating a charging current for charging the battery;

(b) supplying the charging current to the battery;

(c) determining at least one of a charge acceptance ability and a state of charge of the rechargeable lead-acid battery; and (d) determining an overcharge current, the overcharge current exceeding the charge acceptance ability of the battery;

(e) determining an overcharge current increment to be added to the charging current to yield the overcharge current; and (f) during step (b), supplying the overcharge current increment to the battery.

19. The method as defined in claim 18, wherein an overcharge duration and an overcharge time are determined;

the overcharge current is supplied to the battery for the overcharge duration at the overcharge time.

20. The method as defined in claim 19 wherein the overcharge time is after the state of charge of the lead-acid battery reaches 50%.

* * * * *